United States Patent
Hori

(10) Patent No.: US 12,340,011 B2
(45) Date of Patent: Jun. 24, 2025

(54) INFORMATION PROCESSING METHOD AND INFORMATION PROCESSING APPARATUS

(71) Applicant: TOYOTA JIDOSHA KABUSHIKI KAISHA, Aichi-ken (JP)

(72) Inventor: Tatsuro Hori, Tokyo-to (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 18/542,766

(22) Filed: Dec. 18, 2023

(65) Prior Publication Data

US 2024/0220000 A1    Jul. 4, 2024

(30) Foreign Application Priority Data

Dec. 28, 2022  (JP) ................. 2022-212651

(51) Int. Cl.
*G06F 3/01*  (2006.01)
*G06V 40/30*  (2022.01)

(52) U.S. Cl.
CPC .............. *G06F 3/011* (2013.01); *G06F 3/017* (2013.01); *G06V 40/30* (2022.01); *G06F 3/01* (2013.01)

(58) Field of Classification Search
None
See application file for complete search history.

(56) References Cited

U.S. PATENT DOCUMENTS

| | | | |
|---|---|---|---|
| 5,554,033 A * | 9/1996 | Bizzi | A63B 24/0006 482/902 |
| 5,616,078 A | 4/1997 | Oh | |
| 9,195,304 B2 * | 11/2015 | Shimomura | G06T 11/00 |
| 11,210,963 B2 * | 12/2021 | Baker | G09B 19/0038 |
| 2007/0186171 A1 * | 8/2007 | Junuzovic | G06Q 10/10 715/751 |
| 2012/0206577 A1 * | 8/2012 | Guckenberger | G09B 19/003 348/47 |
| 2013/0120445 A1 * | 5/2013 | Shimomura | G02B 27/017 345/629 |
| 2015/0363966 A1 * | 12/2015 | Wells | G06T 7/344 345/419 |
| 2016/0048993 A1 * | 2/2016 | Shimomura | G16H 20/30 345/629 |
| 2019/0158802 A1 * | 5/2019 | Higuchi | G06T 15/20 |
| 2021/0031074 A1 * | 2/2021 | Kim | G06F 3/011 |
| 2022/0036753 A1 * | 2/2022 | Kaku | H04N 9/87 |

FOREIGN PATENT DOCUMENTS

| | | | |
|---|---|---|---|
| JP | H07-185131 A | | 7/1995 |
| JP | 2000-353252 A | | 12/2000 |
| JP | 2013-103010 A | | 5/2013 |
| JP | 2019-095936 A | | 6/2019 |

* cited by examiner

Primary Examiner — Dorothy Harris
(74) Attorney, Agent, or Firm — HAUPTMAN HAM, LLP

(57) ABSTRACT

An information processing method includes acquiring a first model that moves in conjunction with an action of a first user, acquiring a second model that moves in conjunction with an action of a second user, and displaying the first model and the second model on different reference positions from each other while the first user or the second user is continuing a predetermined action.

5 Claims, 3 Drawing Sheets

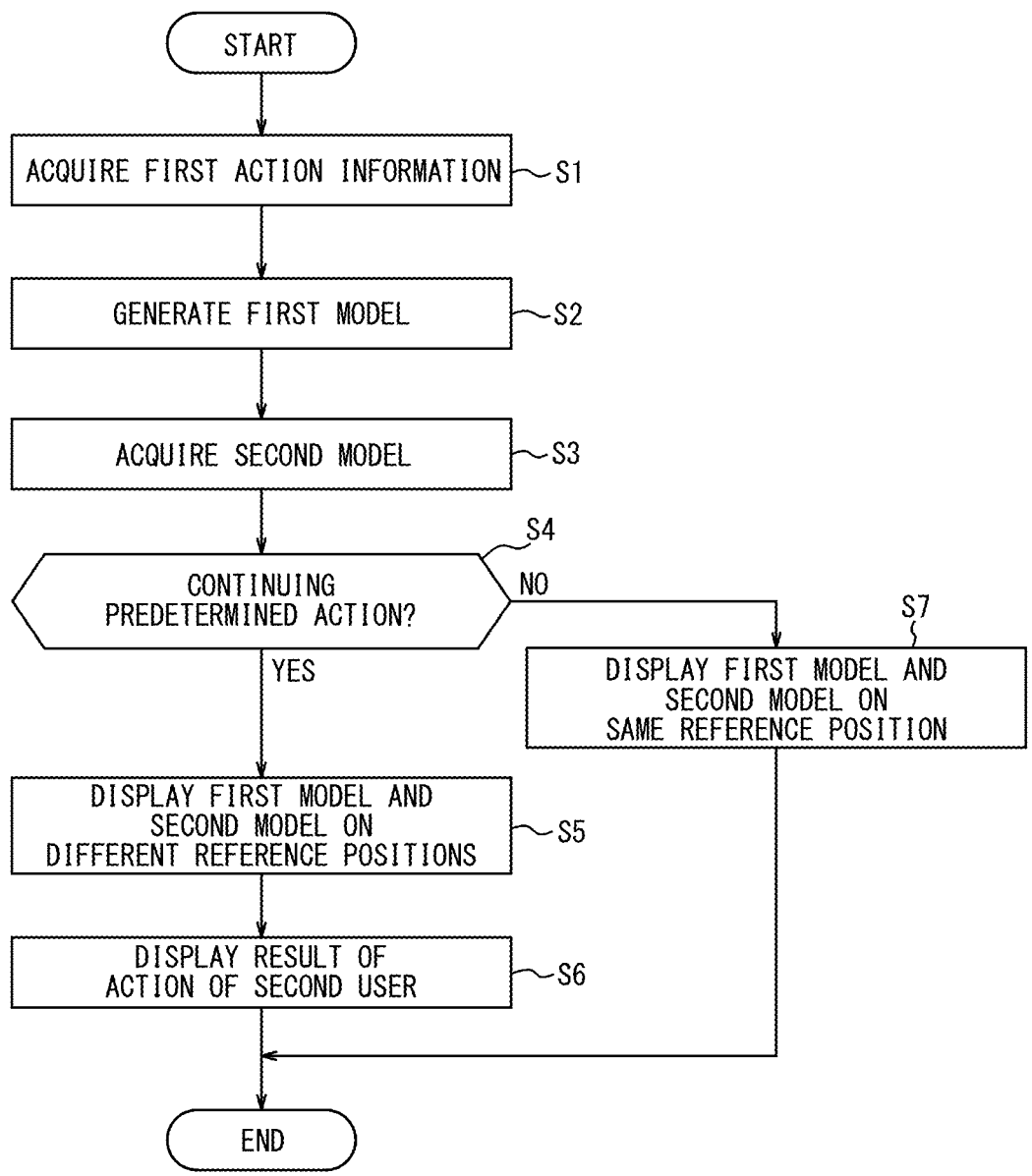

INFORMATION PROCESSING METHOD AND INFORMATION PROCESSING APPARATUS

CROSS-REFERENCE TO RELATED APPLICATION

This application claims priority to Japanese Patent Application No. 2022-212651, filed on Dec. 28, 2022, the entire contents of which are incorporated herein by reference.

TECHNICAL FIELD

The present disclosure relates to an information processing method and an information processing apparatus.

BACKGROUND

A method of superimposing and displaying a stereoscopic image of another person on a body of a user is known. For example, see Patent Literature (PTL) 1.

CITATION LIST

Patent Literature

PTL 1: JP 2000-353252 A

SUMMARY

When a stereoscopic image of another person is superimposed and displayed on a body of a user, the visibility of the body of the user or the stereoscopic image of the other person may be reduced.

It would be helpful to improve the visibility of superimposed display of a user and another person.

An information processing method according to an embodiment of the present disclosure includes:
acquiring, by an information processing apparatus, a first model that moves in conjunction with an action of a first user;
acquiring, by the information processing apparatus, a second model that moves in conjunction with an action of a second user; and
displaying, by the information processing apparatus, the first model and the second model on different reference positions from each other while the first user or the second user is continuing a predetermined action.

An information processing apparatus according to an embodiment of the present disclosure includes a controller. The controller is configured to:
acquire a first model that moves in conjunction with an action of a first user;
acquire a second model that moves in conjunction with an action of a second user; and
display the first model and the second model on different reference positions from each other while the first user or the second user is continuing a predetermined action.

An information processing method and an information processing apparatus according to an embodiment of the present disclosure may improve the visibility of superimposed display of a user and another person.

BRIEF DESCRIPTION OF THE DRAWINGS

In the accompanying drawings:
FIG. 3 is a flowchart illustrating an example procedure for an information processing method according to an embodiment.

DETAILED DESCRIPTION (Configuration of Information Processing System 1)

Figure 1:
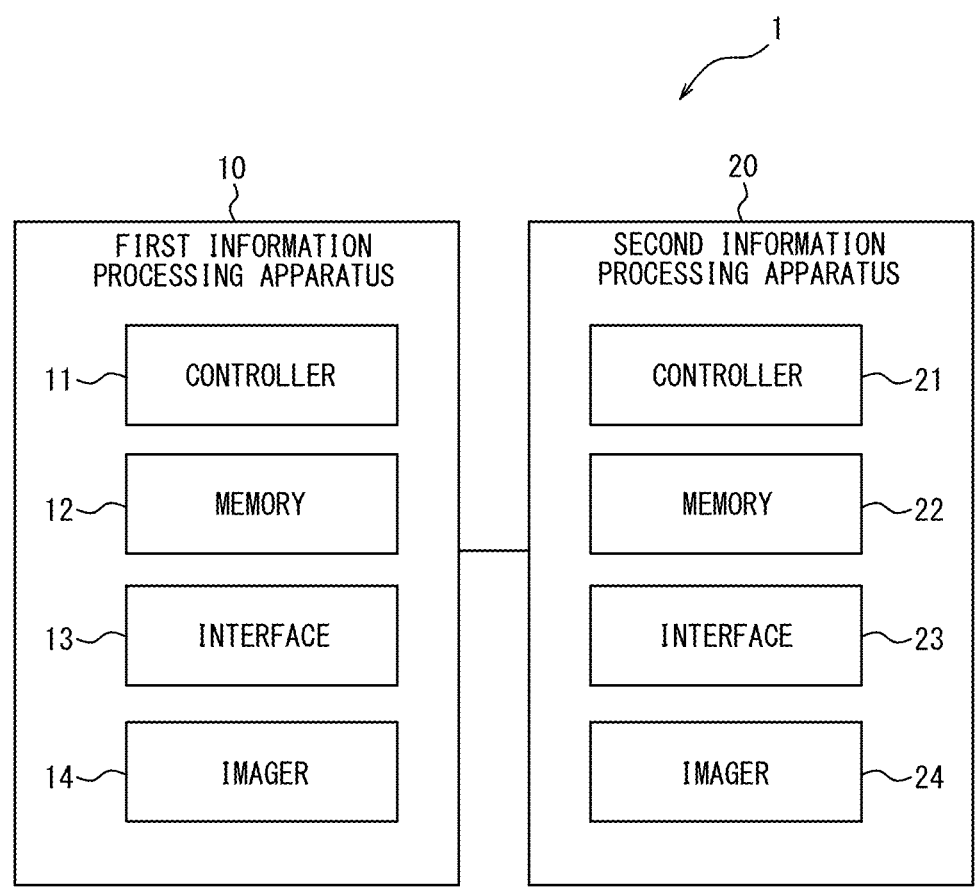
FIG. 1 is a block diagram illustrating an example configuration of an information processing system according to an embodiment.

As illustrated in FIG. 1, an information processing system 1 according to an embodiment includes a first information processing apparatus 10 and a second information processing apparatus 20. The first information processing apparatus 10 or the second information processing apparatus 20 is also referred to simply as an information processing apparatus when there is no need to distinguish. The information processing system 1 can provide a service that allows a student to learn by imitating modeled motions shown by an instructor. Subjects of learning may include, for example, calligraphy, dance, ceramic art, cooking, or the like. Suppose that the information processing system 1 according to the present embodiment is used to provide calligraphy lessons. Suppose that the first information processing apparatus 10 is used by a student learning calligraphy by watching an example of calligraphy. Suppose that the second information processing apparatus 20 is used by an instructor showing an example of calligraphy. Of the users of the information processing system 1, the student who uses the first information processing apparatus 10 is also referred to as a first user. The Instructor who uses the second information processing apparatus 20 is also referred to as a second user.

The numbers of first information processing apparatuses 10 and second information processing apparatuses 20 provided in the information processing system 1 are not limited to one each, and may be two or more. The first information processing apparatus 10 or the second information processing apparatus 20 may be configured to include a personal computer (PC), such as a notebook PC, a desktop PC, or a tablet PC. The first information processing apparatus 10 or the second information processing apparatus 20 may be configured to include a portable terminal, such as a smartphone or tablet, in the possession of the user. The first information processing apparatus 10 or the second information processing apparatus 20 is not limited to these examples, and may be configured to include various devices.

The first information processing apparatus 10 and the second information processing apparatus 20 may be wired or wirelessly communicably connected to each other via a network. The first information processing apparatus 10 and the second information processing apparatus 20 may be wired or wirelessly communicably connected to each other without a network.

The first information processing apparatus 10 includes a controller 11, a memory 12, and an interface 13. The second information processing apparatus 20 includes a controller 21, a memory 22, and an interface 23. The controller 11 is also referred to as a first controller. The controller 21 is also referred to as a second controller. The interface 13 is also referred to as a first interface. The interface 23 is also referred to as a second interface.

The controller 11 controls at least one component of the first information processing apparatus 10. The controller 21 controls at least one component of the second information processing apparatus 20. The controllers 11 and 21 may be configured to be identical or similar. The controller 11 or 21 may be configured to include at least one processor. The "processor" is a general purpose processor, a dedicated processor specialized for specific processing, or the like in the present embodiment but not limited to these. The controller 11 or 21 may be configured to include at least one dedicated circuit. The dedicated circuit may include, for example, a field-programmable gate array (FPGA) or an application specific integrated circuit (ASIC). The controller 11 or 12 may be configured with the dedicated circuit instead of the processor, or may be configured with the dedicated circuit along with the processor.

The memory 12 stores any information to be used for operations of the first information processing apparatus 10. The memory 22 stores any information to be used for operations of the second information processing apparatus 20. The memory 12 or 22 may be configured to be identical or similar. The memory 12 or 22 may store a system program, an application program, or the like. The memory 12 or 22 may be configured to include, for example, semiconductor memory, magnetic memory, optical memory, or the like, but not limited to these, may also include various other types of memory. The memory 12 or 22 may function as, for example, a main memory, an auxiliary memory, or a cache memory. The memory 12 or 22 may be configured to include an electromagnetic storage medium, such as a magnetic disk. The memory 12 or 22 may be configured to include a non-transitory computer readable medium. The memory 12 may be included in the controller 11. The memory 22 may be included in the controller 21.

In the first information processing apparatus 10, the interface 13 outputs information, data, or the like from the controller 11, and inputs information, data, or the like to the controller 11. In the second information processing apparatus 20, the interface 23 outputs information, data, or the like from the controller 21, and inputs information, data, or the like to the controller 21. The interface 13 may include a communication module configured to communicably communicate with the interface 23 of the second information processing apparatus 20, either via a network or without a network. The interface 23 may include a communication module configured to communicably communicate with the interface 13 of the first information processing apparatus 10, either via a network or without a network. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The interface 13 or 23 may be configured to be capable of connecting to an external communication module.

The network may be configured to include the Internet, at least one wide area network (WAN), at least one metropolitan area network (MAN), or any combination thereof. The network may be configured to include at least one wireless network, at least one optical network, or any combination thereof. The wireless network may be configured to include, for example, an ad hoc network, a cellular network, a wireless local area network (LAN), a satellite communication network, or a terrestrial microwave network.

The interface 13 or 23 may be configured to be compliant with a standard such as Universal Serial Bus (USB) or Bluetooth® (Bluetooth is a registered trademark in Japan, other countries, or both).

The interface 13 or 23 may be configured with an input device for accepting input of information, data, or the like from the user. The input device may be configured to include, for example, a touch panel, a touch sensor, or a pointing device such as a mouse. The input device may be configured to include a physical key. The input device may be configured to include an audio input device, such as a microphone. The interface 13 or 23 may be configured to be capable of connecting to an external input device.

The interface 13 or 23 may be configured to include an output device that outputs information, data, or the like to the user. The output device may include, for example, a display device that outputs visual information, such as images, letters, or graphics. The display device may be configured with, for example, a Liquid Crystal Display (LCD), an organic or inorganic Electro-Luminescent (EL) display, a Plasma Display Panel (PDP), or the like. The display device is not limited to the above displays and may be configured to include various other types of displays. The display device may be configured to include a light emitting device, such as a Light Emitting Diode (LED) or a Laser Diode (LD). The display device may be configured to include various other devices. The output device may include, for example, an audio output device, such as a speaker, that outputs audio information, such as voice. The output device may include, for example, a vibration device, such as a vibrator, that outputs tactual information, such as vibration. The output device is not limited to these examples and may include various other devices. The interface 13 or 23 may be configured to be capable of connecting to an external output device. The output device may be configured to be wearable by the first or second user, for example, as a wristband. The output device may be configured as a tool used by the first or second user in practicing motion, such as a brush used in calligraphy, or a knife or cutting board used in cooking.

While not essential, the first information processing apparatus 10 may further include an imager 14. While not essential, the second information processing apparatus 20 may further include an imager 24. The imager 14 is also referred to as a first imager. The imager 24 is also referred to as a second imager. The imager 14 or 24 may include an imaging device such as a camera that captures RGB images. The imager 14 or 24 may include a depth sensor that acquires depth images, or a distance measuring device such as a stereo camera. The first information processing apparatus 10 or the second information processing apparatus 20 may acquire images or distance measuring data (depth data) from an external imaging device or distance measuring device via the interface 13 or 23. The functions of the imaging device or distance measuring device of the imager 14 or 24 may be included in the functions of the interface 13 or 23.

(Example Operations of Information Processing System 1)

Below, an example of operation in which the first user practices calligraphy while watching a model by the second user is described in the information processing system 1 for the present embodiment.

<Acquisition of Action Information>

The controller 11 of the first information processing apparatus 10 acquires information on an action of the first user. The information on the action of the first user is also referred to as first action information. The action of the first user shall include the action of writing letters in a calligraphy practice. In other words, the first action information shall include information on the action of the first user, the student, practicing calligraphy. The controller 21 of the second information processing apparatus 20 acquires information on an action of the second user. The information on the action of the second user is also referred to as second action information. The action of the second user shall include writing characters as an example of calligraphy. In other words, the second action information shall include information on the action of the second user, the instructor, showing an example of calligraphy.

The controller 11 may acquire RGB images or depth images, or the like, of which the imager 14 of the first information processing apparatus 10 captures the first user as the first action information. The controller 21 may acquire RGB images or depth images, or the like, of which the imager 24 of the second information processing apparatus 20 captures the second user, as the second action information. The controller 11 or 21 may acquire RGB images, depth images, or the like, from an external imaging device, ranging device, or the like, via the interface 13 or 23.

<Model Generation>

The controller 11 of the first information processing apparatus 10 generates a first model in conjunction with the action of the first user based on the first action information. The controller 11 may extract skeletal information of the first user from the first action information and generate a first model based on the skeletal information. The controller 11 may generate a first model based on the first user's skeletal information and RGB images.

The controller 21 of the second information processing apparatus 20 generates a second model in conjunction with the second user's action based on the second action information. The controller 21 may extract skeletal information of the second user from the second action information and generate a second model based on the skeletal information. The controller 21 may generate a second model based on the second user's skeletal information and RGB images.

The controller 11 or 21 may generate the first or second model as a 3D model.

The skeletal information may include information representing the position of joints corresponding to human joints. The skeletal information may include information indicating the position and orientation of the bones connecting the joints. The controller 11 may extract the skeletal information of the first user based on the first user's depth image. The controller 21 may extract skeletal information of the second user based on the second user's depth image.

<Display of Model>

The controller 11 of the first information processing apparatus 10 superimposes the first model and the second model on the display device as interface 13. The controller 11 may acquire the second model from the second information processing apparatus 20. The controller 11 may generate the second model by acquiring the second action information from the second information processing apparatus 20. The controller 21 of the second information processing apparatus 20 may superimpose the first model and the second model on the display device as the interface 23. The controller 21 may acquire the first model from the first information processing apparatus 10. The controller 21 may generate the first model by acquiring the first action information from the first information processing apparatus 10.

Figure 2:
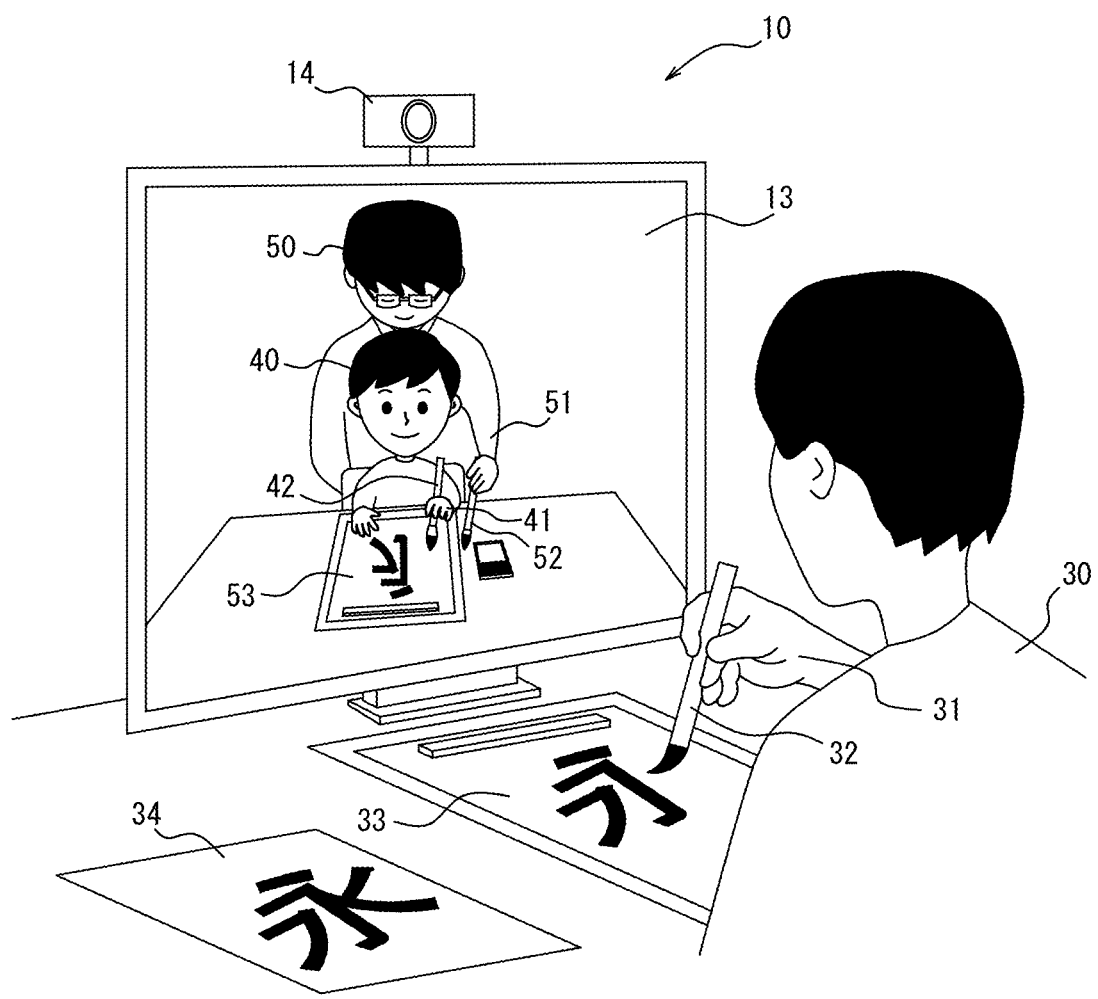
FIG. 2 is a schematic diagram illustrating an example configuration for a first user to practice calligraphy.

The first user practices calligraphy while viewing a superimposed display of the first model and the second model. For example, as shown in FIG. 2, a user 30 corresponding to the first user, who is a student, may practice calligraphy while viewing the display of the display device as the interface 13. In FIG. 2, the user 30 holds the brush 32 in the hand 31 and writes letters on the paper 33 while watching the model 34. On the other hand, suppose the second user, an instructor, is writing characters to show an example of calligraphy elsewhere.

The controller 11 acquires first action information on the user 30 as the first user, generates a first model, and displays a display image 40 of the first model on the interface 13. The display image 40 of the first model includes a display image 41 corresponding to the hand 31 of the user 30 and a display image 42 corresponding to the brush 32. The controller 11 may position the first model in accordance with the reference position set in the virtual space and the display image 40 as an image of the virtual space from a predetermined viewpoint.

On the other hand, the controller 21 acquires the second action information on the second user, generates the second model, and outputs it to the first information processing apparatus 10. The controller 11 acquires the second model from the second information processing apparatus 20 and displays a display image 50 of the second model on the interface 13. The display image 50 of the second model includes a display image 51 corresponding to the second user's hand and a display image 52 corresponding to a brush. The controller 11 may place the second model in line with the reference position set in the virtual space and the display image 50 as an image of the virtual space from a predetermined viewpoint.

The controller 11 may display the display image 40 of the first model or the display image 50 of the second model on the interface 13 as a three-dimensional composite image of the RGB image and the depth image, or as the RGB image alone. The controller 11 may generate a polygon of the first model or the second model based on the depth image and render the RGB image onto the polygon to generate a three-dimensional image.

The controller 11 displays each display image as a mirror image (left-right reversed image) on the interface 13 in FIG. 2. In this way, the first user can easily imitate the actions of the second user. The controller 11 may display each displayed image as a non-inverted image.

Here, if the display image 40 of the first user and the display image 50 of the second user are completely overlapped, it is difficult for the first user to see the second user's actions. Therefore, the controller 11 may make the reference position that is the origin of the coordinate system when the first model is placed in the virtual space and the reference position that is the origin of the coordinate system when the second model is placed in the virtual space different from each other. The reference position that is the origin of the coordinate system when the first model is placed in the virtual space is also referred to as the first reference position. The reference position that is the origin of the coordinate system when the second model is placed in the virtual space is also referred to as the second reference position. In other words, the controller 11 may make the first reference position and the second reference position different from each other. The different reference positions can cause the display image 40 of the first model and the display image 50 of the second model to appear misaligned at interface 13.

The controller 11 displays the first user's hand and the second user's hand in such a way that they do not completely overlap but are slightly shifted so that the first user can easily see the second user's model action. For example, the controller 11 may differentiate the first reference position from the second reference position while the second user is performing a modeling action or while the first user is performing a practice action to imitate a model. In other words, the controller 11 may differentiate between the first and second reference positions while the first or second user continues the predetermined action. The predetermined action may include a calligraphic handwritten action by the second user. The predetermined action may include an action of calligraphy practice by the first user.

The controller 11 may determine whether the first user is continuing the predetermined action based on the first action information. The controller 11 may, for example, determine whether the first user is continuing the predetermined action by comparing the joint or bone movements of the first user's skeletal information with the joint or bone movements in the predetermined action. The controller 11 may determine whether the first user is continuing the predetermined action based on the first user's image. The controller 11 may determine whether the first user is continuing the predetermined action by comparing the first user's image with the image of the predetermined action. The controller 11 may determine that the first user is continuing the predetermined action when the first user has recorded text or other information on a medium such as paper. The controller 11 may determine that the first user is continuing the predetermined action when a writing instrument such as a brush held by the first user is in contact with a medium such as paper.

The controller 11 may acquire the second action information from the second information processing apparatus 20 and determine based on the second action information whether the second user is continuing the predetermined action. The controller 11 may determine whether the second user is continuing the predetermined action based on the image of the second user. The controller 11 may determine whether the second user is continuing the predetermined action in the same manner as the determination regarding the first user. The controller 11 may acquire from the second information processing apparatus 20 the results of the determination as to whether the second user is continuing the predetermined action. In this case, the controller 21 may determine whether the second user is continuing the predetermined action based on the second action information. The controller 21 may determine whether the second user is continuing the predetermined action in the same manner as the controller 11.

The controller 11 may differentiate between the first and second reference positions so that the characteristic parts of the predetermined action are less likely to overlap. For example, if the right hand holding the brush is a feature of the calligraphy movement, the second reference position may be set so that the display image 51 of the second user's right hand moves to the right on the screen more than the display image 41 of the first user's right hand. Conversely, if the display image 51 of the second user's right hand moves to the left, the display image 51 of the second user's right hand can be hidden by the torso portion of the first user's display image 40. By specifying the direction in which the reference position is moved, the display image 51 of the second user's right hand is less likely to be hidden by the display image 40 of the first user.

As described above, the difference between the first reference position and the second reference position while the first user or the second user is continuing the predetermined action can improve the visibility of the second user's action by the first user.

The controller 11 may set the first reference position and the second reference position to the same position if the first and second users are not continuing the predetermined action. In this way, the first user can easily adjust his/her own posture to that of the second user. If the display image 50 of the second user is hidden by the display image 40 of the first user, the controller 11 may store the action of the display image 50 of the second user for later replay and display. If the display image 40 of the first user is hidden by the display image 50 of the second user, the controller 11 may store the action of the display image 40 of the first user for later replay and display. In this way, each user can later see the differences from the other user's action.

The controller 11 may acquire information on the characters the second user is writing on the paper and display it as the display image 53 on the interface 13. The letters that the second user writes on the paper are the result of the second user's actions. Information on the characters the second user is writing on the paper is also referred to as the result of the second user's actions. The action of the second user writing letters on paper can be paraphrased as the action of recording letters or other information on a medium such as paper. If the predetermined operation is to record information on a medium, the controller 11 may display the information recorded on the medium by the second user (written on paper) on the interface 13 so that the first user can see it. In this way, the first user can check the text that the second user, the instructor, is writing. The controller 11 may display the text as a result of the second user's actions, as illustrated in FIG. 2, corresponding to the location where the second user is actually operating. The controller 11 may display the text as the result of the second user's action on the interface 13 in a head-on view. The controller 11 may display or project the image of the characters as a result of the second user's action onto the paper 33 on which the first user is writing. The controller 11 may display the text as the result of the second user's action on the interface 13 in various ways.

<Example Procedure for Information Processing Method>

As described above, in the information processing system 1 according to the present embodiment, the controller 11 of the first information processing apparatus 10 superimposes and displays the actions of the second user on those of the first user so that the first user can practice by imitating the example of the second user. The controller 11 of the first information processing apparatus 10 may perform an information processing method including the procedures of the flowchart in FIG. 3, for example. The information processing method may be implemented as an information processing program to be executed by the controller 11. The information processing program may be stored on a non-transitory computer readable medium.

The controller 11 acquires the first action information (step S1). The controller 11 generates the first model based on the first action information (step S2). The controller 11 acquires the second model from the second information processing apparatus 20 (step S3). The controller 11 determines whether the first user or the second user is continuing the predetermined action (step S4).

If the first user or the second user is continuing the predetermined action (step S4: YES), the controller 11 displays the first model and the second model on different reference positions (step S5). The controller 11 displays the results of the action obtained by the second user continuing the predetermined action (step S6). After completion of the procedure in Step S6, the controller 11 ends the execution of the procedure in the flowchart of FIG. 3.

If the first user or the second user is not continuing the predetermined action (step S4:NO), the controller 11 displays the first model and the second model on the same reference position (step S7). After completion of the procedure in Step S7, the controller 11 ends the execution of the procedure in the flowchart of FIG. 3.

The controller 11 may continue to display the action of the first model and the second model by repeating the steps of the flowchart in FIG. 3. The controller 11 may generate the second model by acquiring the second action information from the second information processing apparatus 20 in the procedure of step S3. The controller 11 may acquire from the second information processing apparatus 20 the result of the judgment as to whether the second user is continuing the predetermined action in the judgment procedure of step S4. After the display procedure of step S7, the controller 11 may store the action of the display image 40 of the first user or the display image 50 of the second user for later replay and display.

SUMMARY

As described above, according to the information processing system 1 for the present embodiment, the first user and the second user are displayed on different reference positions from each other while the first user or the second user is continuing the predetermined action. In this way, the visibility of the second user's actions can be improved when the first user practices the predetermined action. As a result, the practice efficiency of the first user can be improved.

OTHER EMBODIMENTS

An example configuration of an information processing system 1 according to another embodiment will be described below.

The controller 11 of the first information processing apparatus 10 may display the transmittance of one of the display image 40 of the first model or the display image 50 of the second model to be above a predetermined value while the first user or the second user is continuing the predetermined action. For example, the controller 11 may set the transmittance of the display image 40 of the first model to the predetermined value or higher and superimpose it on the display image 50 of the second model. In this way, the first user can easily check both the first user's own actions and the second user's actions. In other words, the visibility of the second user's actions can be improved when the first user practices the predetermined action. The controller 11 may set the transmittance of the display image 50 of the second model to the predetermined value or higher and superimpose it on the display image 40 of the first model while the second user is performing the hand model action.

As mentioned above, the information processing system 1 may be used not only for practicing calligraphy, but also for practicing various movements, such as practicing dance movements, pottery movements, or cooking movements. When the information processing system 1 is used to practice dance movements, the predetermined actions can correspond to the movements of various parts of the body in a dance or the movements of tools used in a dance. If the information processing system 1 is used to practice pottery movements, the predetermined actions can correspond to hand movements in pottery. The result of action can correspond to the result of soil compaction. When the information processing system 1 is used to practice cooking actions, the predetermined actions correspond to the movements of hands or tools such as knives in cooking. The result of action can correspond to the condition of the processed foodstuff.

The information processing system 1 may have one of the first information processing apparatus 10 or the second information processing apparatus 20 function as a host server and the other as a client server.

While an embodiment of the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. An information processing method performed by an information processing apparatus, the information processing method comprising:
    acquiring a first model that moves in conjunction with an action of a first user;
    acquiring a second model that moves in conjunction with an action of a second user;
    determining at least one of whether the first user is continuing a predetermined action based on an image of the first user or whether the second user is continuing the predetermined action based on an image of the second user;
    in response to determining the first user or the second user is continuing the predetermined action, displaying the first model and the second model on different reference positions from each other; and
    in response to determining the first user or the second user is not continuing the predetermined action, displaying the first model and the second model on a same reference position,
    wherein the determining comprises determining the first user or the second user is continuing the predetermined action when a writing instrument held by the first user or the second user is in contact with a medium.

2. The information processing method according to claim 1, further comprising displaying information recorded on the medium by the second user so as to be visually recognizable by the first user in a case in which the predetermined action is an action to record the information on the medium.

3. The information processing method according to claim 2, comprising:
    storing an action of the first user or the second user during a time when the first user and the second user are not continuing the predetermined action so that the action of the first user or the second user can be replayed and displayed.

4. The information processing method according to claim 1, comprising:
    storing an action of the first user or the second user during a time when the first user and the second user are not continuing the predetermined action so that the action of the first user or the second user can be replayed and displayed.

5. An information processing apparatus comprising a controller configured to:
    acquire a first model that moves in conjunction with an action of a first user;
    acquire a second model that moves in conjunction with an action of a second user;
    determine at least one of whether the first user is continuing a predetermined action based on an image of the first user or whether the second user is continuing the predetermined action based on an image of the second user;

in response to the controller determining that the first user or the second user is continuing the predetermined action, display the first model and the second model on different reference positions from each other; and in response to the controller determining that the first user or the second user is not continuing the predetermined action, displaying the first model and the second model on a same reference position, wherein the controller is further configured to determine that the first user or the second user is continuing the predetermined action when a writing instrument held by the first user or the second user is in contact with a medium.

* * * * *